United States Patent [19]

Randell et al.

[11] 4,276,224

[45] Jun. 30, 1981

[54] ANTHRAQUINONE SULPHONAMIDE COMPOUNDS AND PREPARATION

[75] Inventors: Donald R. Randell, Stockport; Emyr Phillips, Sale, both of England

[73] Assignee: Ciba-Geigy Corporation, Ardsley, N.Y.

[21] Appl. No.: 57,157

[22] Filed: Jul. 12, 1979

[30] Foreign Application Priority Data

Jun. 7, 1978 [GB] United Kingdom ............... 26466/78

[51] Int. Cl.$^3$ ........................................ C07C 143/665
[52] U.S. Cl. ..................................... 260/371; 260/372
[58] Field of Search ........................ 260/371, 370, 372

[56] References Cited

U.S. PATENT DOCUMENTS

| | | | |
|---|---|---|---|
| 2,131,742 | 10/1938 | Kumetat et al. | 260/371 |
| 2,132,169 | 10/1938 | Kumetat et al. | 260/372 |
| 2,163,146 | 6/1939 | Kumetat et al. | 260/371 |
| 2,938,914 | 5/1960 | Joyce | 260/371 |
| 2,997,439 | 8/1961 | Nicklin et al. | 208/31 |
| 3,035,889 | 5/1962 | Nicklin et al. | 23/2 |
| 3,627,791 | 12/1971 | Grisar et al. | 260/371 |
| 4,002,727 | 1/1977 | Sonoda et al. | 423/573 |

FOREIGN PATENT DOCUMENTS 465343 4/1937 United Kingdom .
465889 5/1937 United Kingdom .

OTHER PUBLICATIONS

*Chemical Abstract,* vol. 61 #8109f Nicklin et al., 1963, "Removal of Hydrogen Sulfide from Gas, Gas Mixture or Liquid Hydrocarbons by Conversion to Sulfur."

*J. Med. Chem.,* vol. 17, p. 890, 1974, Grisar et al., "Bis Basic-Substituted Polycyclic Aromatic Compounds."
*Chemical Abstract,* vol. 87 #52992r, 1977, Renfrew et al., "Mixture of Disulfoanthraquinonecarboxylic and their Salts for Use in the Stetford Process."
*Chemical Abstract,* vol. 49, #2744e, Sandoz et al., 1954, "Sulfonamides of the Anthraquinone Series."
*Chemical Abstract,* vol. 25, #2745f, Pickey et al., 1954, "1,8-Dihydroxy-5-nitro-4-anilinoanthraquinone Dyes."

Primary Examiner—Patrick Garvin
Assistant Examiner—Raymond K. Covington
Attorney, Agent, or Firm—Luther A. R. Hall

[57] ABSTRACT

Compounds having the general formula:

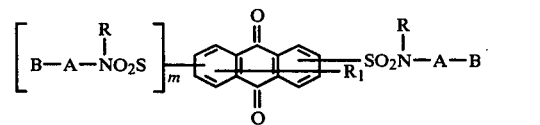

where A is a $C_1$-$C_4$ straight or branched chain alkylene radical, B is a —$SO_3M$, —$CO_2M$, —$PO_3HM$ or —$PO_3M_2$ grouping, M is hydrogen, or a cation giving a water-soluble derivative, R is hydrogen, a cation giving a water-soluble derivative or a $C_1$-$C_4$ straight or branched alkyl, $R_1$ is hydrogen, methyl or —COOH, and m is 0 or 1 and processes of preparing them.

12 Claims, No Drawings

ANTHRAQUINONE SULPHONAMIDE COMPOUNDS AND PREPARATION

The present invention relates to novel anthraquinone sulphonamides and to processes of preparing them.

According to the present invention there is provided a compound having the general formula:

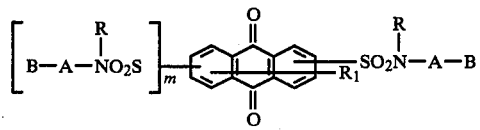 I where A is a $C_1-C_4$ straight or branched chain alkylene radical, B is a $-SO_3M$, $-CO_2M$, $-PO_3HM$ or $-PO_3M_2$ grouping, M is hydrogen, or a cation giving a water-soluble derivative, R is hydrogen, a cation giving a water-soluble derivative or a $C_1-C_4$ straight or branched chain alkyl, $R_1$ is hydrogen, methyl or $-COOH$. and m is 0 or 1

Where M or R is a cation giving a water-soluble derivative this is preferably an alkali metal for example sodium or potassium or an unsubstituted or substituted ammonium cation, for example, ammonium or optionally substituted $C_1-C_6$ alkylammonium, examples of alkyl substituents being methyl, ethyl, propyl, butyl or mono-, di- or tri-hydroxyethyl.

Preferably B is a $-SO_3M$ grouping, $R_1$ is hydrogen and M and R are hydrogen, sodium, potassium or ammonium.

More preferably $R_1$ is hydrogen, M and R are hydrogen, sodium, potassium or ammonium and A is a $C_1-C_4$ straight chain alkylene radical.

Especially preferred compounds are those where $R_1$ is hydrogen, M and R are hydrogen, sodium, potassium or ammonium and A is methylene or ethylene and m is 1.

Non-limiting Examples of the compounds covered by the general formula I are as follows:

Where m =0 and R=$R_1$=H
N-Sulphomethylanthraquinone-2-sulphonamide
N-Sulpho-2-ethylanthraquinone-2-sulphonamide
N-Sulpho-3-propylanthraquinone-2-sulphonamide
N-Sulpho-4-butylanthraquinone-2-sulphonamide
N-Sulpho(1,1-dimethylethyl)anthraquinone-2-sulphonamide Where m=0, R=$C_1-C_4$ alkyl and $R_1$=H
N-Methyl-N-sulpho-methylanthraquinone-2-sulphonamide
N-Methyl-N-sulpho-2-ethylanthraquinone-2-sulphonamide
N-Methyl-N-sulpho-3-propylanthraquinone-2-sulphonamide
N-Methyl-N-sulpho-4-butylanthraquinone-2-sulphonamide Where m=1, R=$R_1$=H
N,N'-Bissulphomethylanthraquinone-1,5-disulphonamide
N,N'-Bissulphomethylanthraquinone-1,6-disulphonamide
N,N'-Bissulphomethylanthraquinone-1,7-disulphonamide
N,N'-Bissulphomethylanthraquinone-2,6-disulphonamide
N,N'-Bissulphomethylanthraquinone-2,7-disulphonamide
N,N'-Bissulpho-2-ethylanthraquinone-1,5-disulphonamide
N,N'-Bissulpho-2-ethylanthraquinone-1,6-disulphonamide
N,N'-Bissulpho-2-ethylanthraquinone-1,7-disulphonamide
N,N'-Bissulpho-2-ethylanthraquinone-2,6-disulphonamide
N,N'-Bissulpho-2-ethylanthraquinone-2,7-disulphonamide
N,N'-Bissulpho-3-propylanthraquinone-1,5-disulphonamide
N,N'-Bissulpho-3-propylanthraquinone-1,6-disulphonamide
N,N'-Bissulpho-3-propylanthraquinone-1,7-disulphonamide
N,N'-Bissulpho-3-propylanthraquinone-2,6-disulphonamide
N,N'-Bissulpho-3-propylanthraquinone-2,7-disulphonamide
N,N'-Bissulpho-4-butylanthraquinone-1,5-disulphonamide
N,N'-Bissulpho-4-butylanthraquinone-1,6-disulphonamide
N,N'-Bissulpho-4-butylanthraquinone-1,7-disulphonamide
N,N'-Bissulpho-4-butylanthraquinone-2,6-disulphonamide
N,N'-Bissulpho-4-butylanthraquinone-2,7-disulphonamide
N,N'-Bissulpho(1,1-dimethylethyl)anthraquinone-2,6-disulphonamide
N,N'-Bissulpho(1,1-dimethylethyl)anthraquinone-2,7-disulphonamide Where m=1, R=$C_1-C_4$ alkyl, $R_1$=H
N,N'-Dimethyl-N,N'-bissulphomethylanthraquinone-1,5-disulphonamide
N,N'-Diethyl-N,N'-bissulphomethylanthraquinone-1,6-disulphonamide
N,N'-Dipropyl-N,N'-bissulphomethylanthraquinone-1,7-disulphonamide
N,N'-Dimethyl-N,N'-bissulphomethylanthraquinone-2,6-disulphonamide
N,N'-Diethyl-N,N'-bissulphomethylanthraquinone-2,7-disulphonamide
N,N'-Dimethyl-N,N'-bissulpho-2-ethylanthraquinone-1,5-disulphonamide
N,N'-Diethyl-N,N'-bissulpho-2-ethylanthraquinone-1,6-disulphonamide
N,N'-Dipropyl-N,N'-bissulpho-2-ethylanthraquinone-1,7-disulphonamide
N,N'-Dimethyl-N,N'-bissulpho-2-ethylanthraquinone-2,6-disulphonamide
N,N'-Diethyl-N,N'-bissulpho-2-ethylanthraquinone-2,7-disulphonamide
N,N'-Dimethyl-N,N'-bissulpho-3-propylanthraquinone-1,5-disulphonamide
N,N'-Diethyl-N,N'-bissulpho-3-propylanthraquinone-1,6-disulphonamide
N,N'-Dipropyl-N,N'-bissulpho-3-propylanthraquinone-1,7-disulphonamide
N,N'-Dimethyl-N,N'-bissulpho-3-propylanthraquinone-2,6-disulphonamide N,N'-Diethyl-N,N'-bissulpho-3-propylanthraquinone-2,7-disulphonamide N,N'-Dimethyl-N,N'-bissulpho-4-butylanthraquinone-1,5-disulphonamide N,N'-Diethyl-N,N'-bissulpho-4-butylanthraquinone-1,6-disulphonamide N,N'-Dipropyl-N,N'-bissulpho-4-butylanthraquinone-1,7-disulphonamide N,N'-Dimethyl-N,N'-bissulpho-4-butylanthraquinone-2,6-disulphonamide N,N'-Diethyl-N,N'-bissulpho-4-butylanthraquinone-2,7-disulphonamide or a compound corresponding to any of the above compounds, but where B is —$CO_2H$ or —$PO_3H_2$ instead of —$SO_3H$ or any mixture thereof.

Especially preferred compounds are:

N,N'-Bissulphomethylanthraquinone-2,6-disulphonamide

N,N'-Bissulphomethylanthraquinone-2,7-disulphonamide or a mixture of these compounds in any proportion N,N'-Bissulpho-2-ethylanthraquinone-2,6-disulphonamide N,N'-Bissulpho-2-ethylanthraquinone-2,7-disulphonamide or a mixture of these compounds in any proportion.

Further Examples of compounds of general formula I include the alkali metal or amine salts of any of the above compounds particularly the sodium, potassium or ammonium salts.

The compounds of formula I where R is H or $C_1$–$C_4$ straight or branched chain alkyl may be prepared by reacting the corresponding anthraquinone sulphonyl halide having the general formula

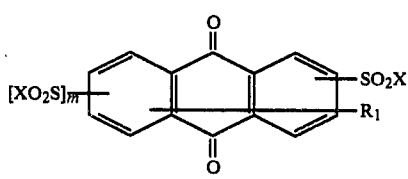

with a compound having the general formula

   III where X is halogen, especially chlorine, $R_2$ is H or $C_1$–$C_4$ straight or branched chain alkyl and A, m, B and $R_1$ have their previous significance.

The reaction may conveniently be carried out by adding the compound of formula III to a solution of the compound of formula II in a solvent system consisting of aqueous alkali and a water-soluble ether at less than 20° C. The reaction time may vary depending on the circumstances but is conveniently from 1 to 12 hours. An example of a water-soluble ether is tetrahydrofuran.

The compound of formula II may be prepared by the method described by Kozlov et al., J.Gen.Chem.Russ 1947, 17,289.

The compounds of formula I where A is —$CH_2$— may also be prepared by reacting the corresponding anthraquinone sulphonamide having the general formula

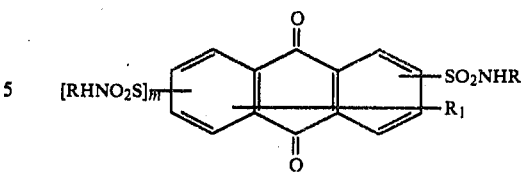

with a compound having the general formula

HOCH$_2$B    V where m, B, R and $R_1$ have their previous significance.

The reaction may conveniently be carried out by adding a compound of formula IV to a solution of a compound of formula V in water and heating at a temperature up to 100° C. The reaction time may vary depending upon the circumstances but is conveniently from 1 to 12 hours. The temperature of the reaction is preferably from 60° C. to 80° C.

The compound of formula V where B is —$SO_3Na$ may conveniently be prepared from formaldehyde and sodium bisulphite in aqueous solution at 70° C. In this case the compound of formula I is normally prepared by adding the compound of formula IV to such a solution.

The compounds of formula IV may be prepared by the method described by Tr. Leningr. Khim-Farmat-seut.Inst., 1960, 11,48.

The compounds having the general formula I may be used as intermediates for dyestuff chemicals, agrochemicals or pharmaceuticals.

Also, the removal of hydrogen sulphide as sulphur from gases by the methods described in British Pat. Specification 871,233 and 948,270 may be carried out but using the compounds of formula I in aqueous alkaline solution instead of the anthraquinone disulphonic acids there used, as described in our copending Application Ser. No. 57,154.

This invention also provides an aqueous alkaline solution of a compound of formula I which solution may contain a compound of a metal having at least two valency states for example a vanadium compound and if necessary a chelating or sequestering agent for retaining such metal compounds in solution. Such solutions are suitable for the absorption of hydrogen sulphide and converting it to sulphur. The vanadium compound may be an ortho-, meta-, or pyrovanadate of ammonia or of an alkali metal for example sodium ammonium vanadate or sodium orthovanadate.

Since the presence of chloride ions may lead to corrosion in the treatment plants for the removal of hydrogen sulphide as sulphur the method of preparing the compound of formula I by the reaction of compounds IV and V is advantageous in that it gives a product substantially free from chloride ions.

The following Examples further illustrate the present invention in which the anthraquinone sulphonyl chlorides and sulphonamides are prepared by the literature methods indicated above.

EXAMPLE 1

76.9 Parts sodium formaldehyde bisulphite and 22.9 parts sodium hydroxide in 300 parts of water are charged into a 3-neck flask equipped with a stirrer, thermometer, condenser and the solution heated to 70°. 105 Parts of a 1:1 mixture of anthraquinone-2,6/2,7-disulphonamides are added portionwise and the resulting mixture heated at 70° during 3 hours. Evaporation of the resulting solution gives 171.4 parts of the dark brown tetrasodium N,N'-disulphonomethylanthraquinone-2,6/2,7-disulphonamides having a melting point of >300° and the following analysis:

C, 25.9; H, 2.2; N, 4.1; S, 17.7; Na, 13.2; Cl$^-$, 0.1%; SO$_4^{2-}$, 16.9% and a water content of 5.4%.

EXAMPLE 2

4.4 Parts aminomethanesulphonic acid and 1.6 parts sodium hydroxide in 50 parts water and 150 parts tetrahydrofuran are charged into a 4-neck flask equipped with a stirrer, thermometer, condenser and pH electrode. 8 Parts anthraquinone-2,6-disulphonylchloride are added portionwise, the pH being maintained at 11.5 by the addition of 8 N sodium hydroxide solution and the temperature at <20° with ice cooling. Evaporation of the resulting solution gives 14.2 parts mustard coloured disodium N,N'-disulphonomethylanthraquinone-2,6-disulphonamide having melting point >300° and the following analysis:

C, 24.1; H, 2.0; N, 3.1; S, 15.7; Na, 15.8; Cl$^-$, 8.0 and SO$_4^{2-}$, 12.7%.

EXAMPLE 3

10 Parts taurine and 3.2 parts sodium hydroxide in 100 parts water and 160 parts tetrahydrofuran are charged into a 4-neck flask as in Example 2. 16 Parts anthraquinone-2,6-disulphonylchloride are added portionwise, the pH maintained at 12.5 with 8 N sodium hydroxide solution and the temperature at <20° with ice cooling. Evaporation of the resulting solution gives 34.5 parts of the brown disodium N,N'-disulphonoethylanthraquinone-2,6-disulphonamide having a melting point >300° and the following analysis:

C, 30.9; H, 2.6; N, 3.1; S, 16.7; Na, 7.4; Cl$^-$, 5.9 and SO$_4^{2-}$, 7.2%.

EXAMPLE 4

4.4. Parts aminomethanesulphonic acid and 1.6 parts sodium hydroxide in 250 parts water are charged into a 4-neck flask as in Example 2. 8 Parts of a 1:1 mixture of anthraquinone-2,6/2,7-disulphonylchlorides are added portionwise. The pH is maintained at 11.8 with 8 N sodium hydroxide solution during 15 hours or until a complete solution is obtained. Evaporation of this solution gives the brown tetrasodium N,N'-disulphonomethylanthraquinone-2,6/2,7-disulphonamides having a melting point >300° and the following analysis C, 21.8; H, 1.7; N, 2.4; S, 13.9; Na, 19.8; Cl$^-$, 10.2 and SO$_4^{2-}$, 21.2%.

EXAMPLE 5

6.2 Parts taurine and 2 parts sodium hydroxide in 50 parts water and 34 parts tetrahydrofuran are charged into a 4-neck flask as in Example 2. 10 Parts of a 1:1 mixture of anthraquinone-2,6/2,7-disulphonylchlorides are added portionwise, the pH maintained at 13.1 with 8 N sodium hydroxide solution and the temperature at <20° with ice cooling. Evaporation of the resulting solution gives 21.3 parts of the brown-black tetrasodium N,N'-disulphonoethylanthraquinone-2,6/2,7-disulphonamides having a melting point >300° and the following analysis:

C, 23.3; H, 2.6; N, 3.1; S, 14.4; Na, 14.7; Cl$^-$, 7.9 and SO$_4^{2-}$, 4.5%.

EXAMPLE 6

6 Parts glycine and 3.2 parts sodium hydroxide in 100 parts water and 100 parts tetrahydrofuran are charged into a four-neck flask equipped with a stirrer, thermometer, condenser and pH electrode. 16 Parts of a 1:1 mixture of anthraquinone-2,6/2,7-disulphonylchlorides are added portionwise, the pH being maintained at 12.3 by the addition of 8 N sodium hydroxide solution and the temperature at <20° with ice cooling. Evaporation of the resulting solution gives 28.7 parts of the black tetra-sodium N,N'-di carboxymethylanthraquinone 2,6-/2,7-disulphonamides having a melting point of ≈250° dec.

EXAMPLE 7

4 Parts sodium formaldehyde bisulphite and 1.2 parts sodium hydroxide in 20 parts water are treated with 5.6 parts anthraquinone-2,7-disulphonamide as described in Example 1. Evaporation of the resulting solution gives 6.5 parts of the dark brown sodium salts of N,N'-disulphonomethylanthraquinone-2,7-disulphonamide having a melting point >250° and the following analysis:

C, 16.3; H, 2.3; N, 3.6; S, 19.5; Na, 14.4; Cl$^{31}$ <0.1 and SO$_4^{2-}$, 14.0%.

EXAMPLE 8

3.7 Parts sodium formaldehyde bisulphite and 1.1 parts sodium hydroxide in 20 parts water are treated with 5 parts anthraquinone-1,5-disulphonamide as described in Example 1. Evaporation of the resulting solution gives 6.5 parts of the black sodium salts of N,N'-disulphonomethylanthraquinone-1,5-disulphonamide having a melting point >300° and the following analysis:

C, 20.2; H, 2.1; N, 3.7; S, 18.2; Na, 15.5; Cl$^-$, 0.9; SO$_4^{2-}$, 16.9% and a water content of 8.2%.

EXAMPLE 9

6.1 Parts sodium formaldehyde bisulphite and 1.8 parts sodium hydroxide in 40 parts water are treated with 8.4 parts of a mixture of anthraquinone-1,6/1,7-disulphonamides as described in Example 1. Evaporation of the resulting solution gives 15.1 parts of the black sodium salts of N,N'-disulphonomethylanthraquinone-1,6/1,7-disulphonamides having a melting point >300° and the following analysis:

C, 26.1; H, 2.1; N, 3.6; S 17.99; Na, 13.3; Cl$^-$, 0.4; SO$_4^{2-}$, 15.9% and a water content of 6.7%.

The use of potassium formaldehyde bisulphite in Examples 1 and 7 to 9 and potassium hydroxide in Examples 2-6 would provide the corresponding tetrapotassium salts. Similarly, ammonium formaldehyde bisulphite and ammonium hydroxide would provide the tetra-ammonium salts.

We are aware of British Pat. No. 465343 but we make no claim to any of the acid amides of the anthraquinone series per se disclosed therein.

What we claim is:

1. A compound identified as,

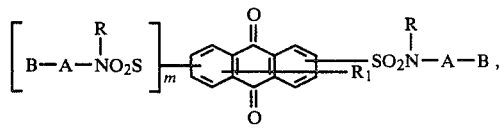

wherein A is a $C_1$–$C_4$ straight or branched chain alkylene radical,

B is a —$SO_3M$, —$CO_2M$, —$PO_3HM$ or —$PO_3M_2$ grouping,

M is hydrogen or a cation giving a water-soluble derivative,

R is hydrogen, a cation giving a water-soluble derivative or a $C_1$–$C_4$ straight or branched chain alkyl, $R_1$ is hydrogen, methyl or —COOH, and m is 1, with the proviso that when B is —$SO_3M$, A cannot be ethylene and R cannot be methyl.

2. A process for preparing a compound identified as,

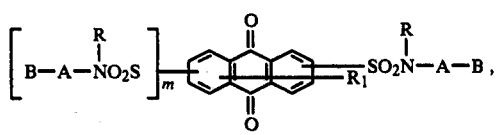

wherein A is —$CH_2$—,

B is a —$SO_3M$, —$CO_2M$, —$PO_3HM$ or —$PO_3M_2$ grouping,

M is hydrogen or a cation giving a water-soluble derivative,

R is hydrogen, a cation giving a water-soluble derivative or a $C_1$–$C_4$ straight or branched chain alkyl, $R_1$ is hydrogen, methyl or —COOH, and m is 0 or 1, which comprises reacting an anthraquinone sulphonamide,

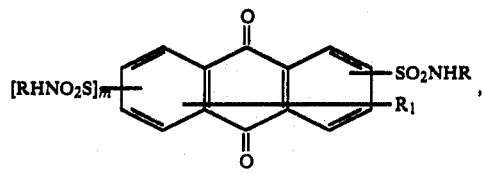

with a compound identified as formula $HOCH_2B$.

3. A process as claimed in claim 2, in which $HOCH_2B$ is first prepared from formaldehyde and sodium bisulphite in aqueous solution at 70° C., the anthraquinone sulphonamide then being added to this solution.

4. A compound as claimed in claim 1 in which B is a —$SO_3M$ grouping, $R_1$ is hydrogen and M and R are hydrogen, an alkali metal or an unsubstituted or substituted ammonium cation.

5. A compound as claimed in claim 1 or claim 4 in which A is a $C_1$–$C_4$ straight chain alkylene radical.

6. A compound as claimed in claim 1 in which A is methylene or ethylene.

7. A compound as claimed in claim 1 in which M and R are independently an alkali metal or amine salt.

8. A compound as claimed in claim 1 in which M and R are independently sodium, potassium or ammonium.

9. N,N'-Bissulphomethylanthraquinone-2,6-disulphonamide.

10. N,N'-Bissulphomethylanthraquinone-2,7-disulphonamide.

11. N,N'-Bissulpho-2-ethylanthraquinone-2,6-disulphonamide.

12. N,N'-Bissulpho-2-ethylanthraquinone-2,7-disulphonamide.

* * * * *

UNITED STATES PATENT AND TRADEMARK OFFICE
CERTIFICATE OF CORRECTION

PATENT NO. : 4,276,224
DATED : June 30, 1981
INVENTOR(S) : DONALD RICHARD RANDELL ET AL It is certified that error appears in the above—identified patent and that said Letters Patent is hereby corrected as shown below:

Cover Page, Section 30 reads:

"[30] Foreign Application Priority Data

Jun. 7, 1978 [GB] United Kingdom.......26466/78"

Should read:

"[30] Foreign Application Priority Data

July 21, 1978 [GB] United Kingdom.......30844/78"

Signed and Sealed this

Eighth Day of December 1981

[SEAL]

Attest:

GERALD J. MOSSINGHOFF

Attesting Officer    Commissioner of Patents and Trademarks